G. F. ERICH.
APPARATUS FOR DISTRIBUTING MATERIALS, SUCH AS FERTILIZERS.
APPLICATION FILED APR. 12, 1910.
1,005,525.
Patented Oct. 10, 1911.
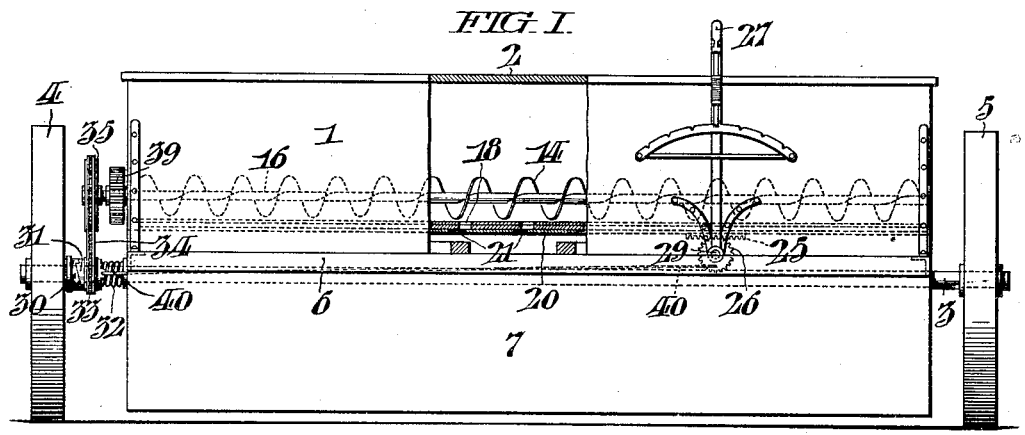
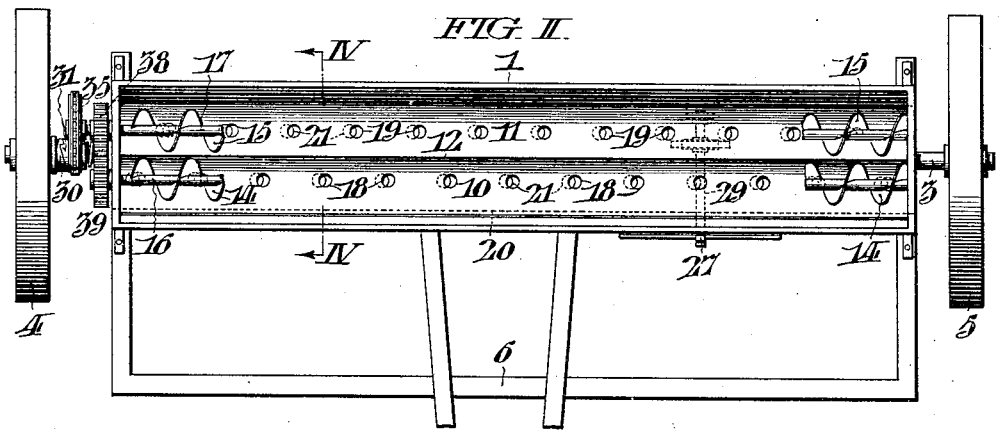
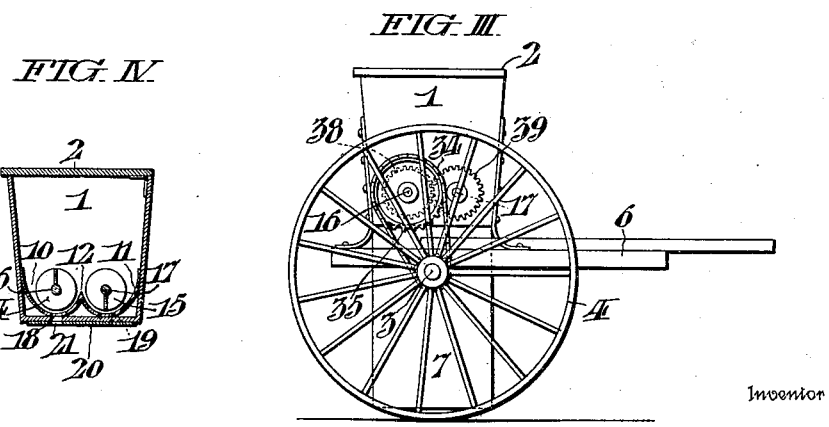
Inventor
George F. Erich,
Attorneys

UNITED STATES PATENT OFFICE.

GEORGE F. ERICH, OF ALLENTOWN, PENNSYLVANIA.

APPARATUS FOR DISTRIBUTING MATERIALS SUCH AS FERTILIZERS.

1,005,525. Specification of Letters Patent. Patented Oct. 10, 1911.

Application filed April 12, 1910. Serial No. 554,950.

*To all whom it may concern:*

Be it known that I, GEORGE F. ERICH, of Allentown, in the county of Lehigh and State of Pennsylvania, have invented certain new and useful Improvements in Apparatus for Distributing Materials such as Fertilizers, &c., whereof the following is a specification, reference being had to the accompanying drawings.

My invention is primarily intended for the distribution of fertilizers, but, obviously it may be employed for the distribution of any material under similar conditions.

In the accompanying drawings, Figure I, represents a front elevation of a machine embodying my improvements, a portion of the casing being broken away so as to show a partial interior view in longitudinal section through the receptacle for the fertilizer. Fig. II, is a plan view of the machine with the cover of the receptacle removed. Fig. III, is an end elevation. Fig. IV, is a transverse section of the receptacle on the line IV, IV, of Fig. II.

My distributing apparatus is shown mounted transversely upon a vehicle comprising an axle 3, running wheels 4, 5, and a frame 6, which may support a platform for the driver, and to which shafts may be attached in case the vehicle is to be drawn by a horse. The apparatus comprises an elongated rectangular receptacle 1, having a hinged cover 2, and adapted to contain a quantity of material intended for distribution. Beneath the receptacle proper and coextensive therewith, is a chute 7, inclosed at the front, rear and ends, but open at the bottom, so as to insure the protection of the material while falling from the receptacle.

The specific features of improvement relate to the feeding devices for the material, which will now be described.

Referring to Figs. II, and IV, it will be seen that the lower portion of the receptacle contains two open-topped troughs 10, and 11, respectively, of curved cross-section, the proximate edges of said troughs meeting in a ridge 12, running along the center line of the receptacle, while their remote edges are in close contact with the front and rear walls thereof. Within these troughs, respectively, are arranged screw propellers 14, and 15, whose shafts 16, and 17, are rotated in opposite directions by means hereafter described. Apertures 18, are arranged at intervals along the bottom of the trough 10, and apertures 19, are similarly arranged in the trough 11, the apertures of one trough however, being preferably staggered with relation to those of the other, as shown most clearly in the plan view of Fig. II. These apertures register with corresponding ones in the bottom of the receptacle 1. A sliding plate 20, provided with two series of apertures 21, adapted to register with the respective apertures of the troughs, is mounted in guides upon the bottom of the receptacle 1, so as to be capable of longitudinal movement with relation thereto. This longitudinal movement of the plate is such as to permit the complete registration of the apertures therein with the corresponding ones in the troughs, and bottom of the receptacle, and also to permit the gradual reduction of the effective area thereof down to and including a position of complete closure. Said sliding plate is adjustably actuated by means of a rack 25, mounted on the bottom thereof, and gear 26, attached to a rockshaft 29, mounted upon the bottom of the receptacle 1, which rock-shaft may be shifted manually by means of a lever 27. The screw conveyers 14, and 15, are actuated in opposite directions by a train of gearing which comprises the following elements: A clutch member 30, is mounted upon the hub of the running wheel 4, and is adapted to engage with a corresponding clutch member 31, journaled upon the axle 3, and capable of longitudinal movement thereon. A spring 32, tends to press said clutches into engagement. The clutch 31, is provided with a rigidly attached sprocket wheel 33, whose chain 34, engages with a second sprocket wheel 35, mounted upon the end of the shaft 17. Said shaft 17, carries a spur gear 38, which meshes with a corresponding spur gear 39, mounted upon the shaft 16. It will be seen that when the clutch members 30, and 31, are in engagement, and the machine is drawn upon its running wheels 4, and 5, motion in opposite directions will be transmitted to the shafts 16, and 17, so that the conveyers 14, and 15, whose spirals are similarly disposed, shall propel the material in opposite directions along the respective troughs. The hub of the clutch 33, is connected by means of a flexible wire or chain 40, with the gear 26, in such relation to the engagement of the latter with the rack 25, as that when the hand lever 27, is in the position corresponding with the complete closure of the apertures by means of the plate 20, the clutch shall be disengaged, thus rendering the conveyers inoperative when the distributing apertures are closed.

By the above mentioned arrangement, I not only am enabled to obtain a very uniform discharge of the fertilizer throughout the entire length of the rows of apertures, but can conduct such distribution to the point of discharging practically all the material from within the receptacle. The action of the conveyers keeps the material continually traveling from end to end of the receptacle in opposite directions, thus preventing excessive accumulation at any region, and the configuration of the troughs is such that the material must always tend to fall into a position where it can be acted upon by the conveyers to insure uniform and complete discharge.

In the foregoing specification, I have described the conveyers as being similar to one another in the arrangement of their spirals, and hence as being actuated in opposite direction, but, I do not limit myself to this arrangement, it being only necessary that the conveying action should be in opposite directions in the troughs.

I am aware that the use of a conveyer in a fertilizer distributer is not broadly speaking, new, and I therefore do not claim the same.

I claim:—

1. The combination, with a receptacle adapted to contain material for distribution; of a pair of troughs arranged longitudinally therein, said troughs being provided with apertures; conveyers arranged in said troughs respectively; means for actuating said conveyers to move the material in opposite directions along said troughs respectively; a plate having apertures in correspondence with those of the troughs, said plate being arranged to move with relation to the bottom thereof; actuating mechanism for shifting said plate; driving mechanism for actuating said conveyers, said driving mechanism including a detachable element; and means, operatively connected with said detachable element, and with the actuating mechanism for said plate, whereby movement of the plate to close the apertures disengages said driving mechanism, substantially as set forth.

2. The combination with a receptacle; of a pair of troughs of curved cross-section, arranged longitudinally therein, and having apertures along the bottom, the proximate edges of said troughs meeting in a ridge; conveyers mounted in said troughs respectively; a plate having apertures adapted to register with the apertures of the troughs; means for actuating said conveyers to move the material in opposite directions; and means for shifting said plate into positions to open, reduce, or close said apertures, substantially as set forth.

3. The combination of a vehicle; a pair of parallel troughs, with distributing apertures, carried by said vehicle and mounted transversely thereto; and means whereby the material for distribution is continuously conveyed along said troughs respectively in opposite directions.

In testimony whereof, I have hereunto signed my name, at the city of Allentown, Pennsylvania this sixth day of April 1910.

GEORGE F. ERICH.

Witnesses:
ROBERT L. STUART,
MARY O'DONNELL.

---

Copies of this patent may be obtained for five cents each, by addressing the "Commissioner of Patents, Washington, D. C."